United States Patent [19]
Albright

[11] 3,905,104
[45] Sept. 16, 1975

[54] REPLACEABLE LINERS FOR SAW BAR GROOVES

[76] Inventor: Alva Z. Albright, 2909 Monreo Hwy., Pineville, La. 71360

[22] Filed: June 19, 1974

[21] Appl. No.: 480,992

[52] U.S. Cl. .................. 30/384; 30/387; 83/825
[51] Int. Cl.² ........................................ B23D 59/00
[58] Field of Search ........ 76/74, 25 A; 30/381, 385, 30/387; 83/823

[56] References Cited
UNITED STATES PATENTS

| | | | |
|---|---|---|---|
| 2,948,309 | 8/1960 | Hoff et al. | 30/387 |
| 3,331,407 | 7/1967 | Merz | 30/387 |
| 3,390,710 | 7/1968 | Cookson et al. | 30/381 |
| 3,416,578 | 12/1968 | Irgens | 30/387 |

*Primary Examiner*—Leonidas Vlachos
*Attorney, Agent, or Firm*—James B. Lake, Jr.

[57] ABSTRACT

Replaceable liners are inset into saw bar enlarged perimetrical grooves for receiving the cutting and opposite runs of a chain saw mounted therein for travel. Said travel causes wear at the top and sides of the liners which are replaceable, and the life of the saw bar is indefinitely extended. The replaceable liners are wholly inset in the said bar and can be transversely riveted in place through holes defined in the saw bar sides and the liner bottom, both of which are not subject to wear. Rivet heads are cut and rivets withdrawn to replace liners.

1 Claim, 2 Drawing Figures

3,905,104

REPLACEABLE LINERS FOR SAW BAR GROOVES

BACKGROUND OF THE INVENTION

1. Field Of The Invention

The invention relates generally to chain saws, and more particularly to means for extending the life of saw bars of said chain saws indefinitely.

2. Description Of The Prior Art

Until recently chain saws have been light and hand carried and the replacement of a saw bar of little economic importance. Now chain saws may be so large that they have to be mounted on power train carriers and the replacement of saw bars a matter of economic concern.

Heretofore the solutions of reducing wear has been sought in improving lubrication between moving parts. However Lange, U.S. Pat. No. 2,109,702 teaches a bottom insert strip 23 (FIG. 3) for reducing wear at the bottom of the groove 22 in a special type of chain saw.

SUMMARY OF THE INVENTION

The object of the invention is to provide means for extending the life of a saw bar for an indefinitely long period of time in a way not heretofore thought possible in this particular field of the art.

DETAILED DESCRIPTION

Figure 1:
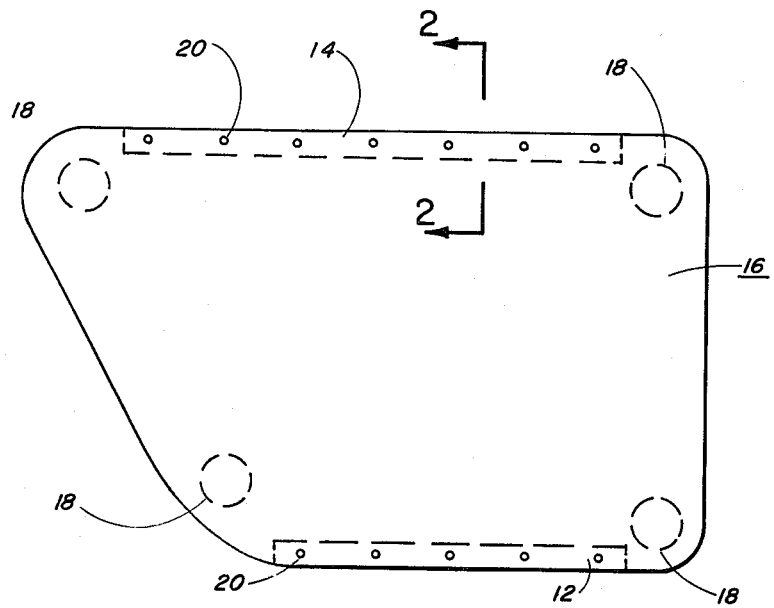
FIG. 1 is a plan view of a saw bar with replaceable liners mounted therein.
Figure 2:
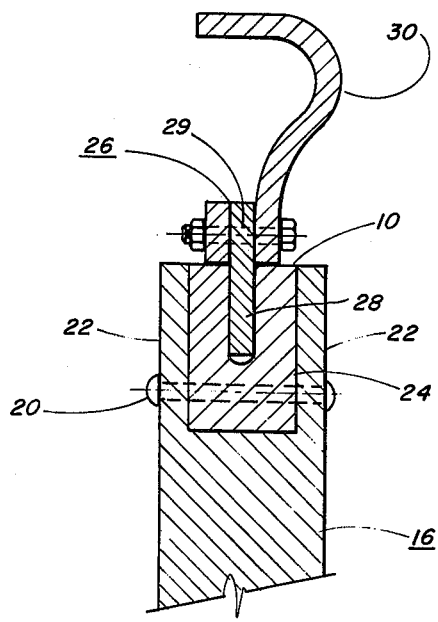
FIG. 2 is a sectional view along section lines 2—2 of FIG. 1 including a sectional view of a saw chain slidably mounted.

Referring to FIGS. 1 and 2, the invention comprises two sections of open topped and round bottomed groove liner 10 mounted in oppositely disposed peripheral grooves 12 and 14, respectively the cutting run and opposite run edges of a rectangularly shaped saw bar 16 having pulleys 18 mounted for rotation at each angle thereof in the plane of the saw bar and mounted groove liners.

The liners 10 are held in the saw bar grooves 12 and 14 by rivets 20 engaging transversely through saw bar sides 22 and the bottoms 24 of said liners.

A saw chain 26 is mounted in said groove liners 10 and around pulleys 18. Sliding lugs 28 on said saw chain depend into groove liners 10 in a sliding fit, and the pivoted junctions 29 thereof with cutting blade segments 30 of saw chain 26 slidable on the tops of liners 10. Thus the moving parts of the rotating saw chain are in sliding friction with the groove liners only, and the resulting wear takes place wholly therebetween and none takes place in the saw bar.

The size of the invention's saw bar permits grooving it to accept inserted groove liners rather than mounting grooved extensions to the perimeter of the saw bar, and the inserted groove liners permits transverse fastening of the liners in the grooves in reinforcement thereof, both contributing to a stronger and better operational saw bar.

What is claimed is:

1. In a rectangularly shaped saw bar having four peripheral edges arranged in oppositely disposed pairs, the edges of one said pair being designated respectively as cutting run and opposite run edges, with pulleys mounted adjacent intersections of said peripheral edges for rotation in a common plane thereof:
   a. a peripheral groove respectively defined with sides in each of said cutting run and opposite run edges;
   b. an open-topped replaceable groove liner, having a solid closed bottom and adapted to fit into and fill each of said peripheral grooves, mounted in said peripheral grooves with said open tops flush with said cutting run and opposite run edges for slidably engaging all elements of an articulated saw chain contacting said saw bar when operationally mounted thereon for rotation therearound; and
   c. a plurality of fastening means adapted to engage in transversely aligned holes defined respectively in said solid closed bottoms of said groove liners and defined in said sides of the peripheral grooves for securing said groove liners therein and for strengthening and stiffening said cutting run and opposite run edges, thereby maximizing the strength and minimizing operational stresses on, and wear of, said saw bar.

* * * * *